United States Patent
Okamura et al.

(10) Patent No.: US 8,178,627 B2
(45) Date of Patent: May 15, 2012

(54) OXYMETHYLENE COPOLYMER COMPOSITION FOR STRETCHING MATERIAL, STRETCHING MATERIAL, STRUCTURES, AND PROCESS FOR PRODUCING THE SAME

(75) Inventors: Akira Okamura, Mie (JP); Satoshi Nagai, Mie (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 12/517,469

(22) PCT Filed: Dec. 3, 2007

(86) PCT No.: PCT/JP2007/073345
§ 371 (c)(1),
(2), (4) Date: Sep. 21, 2009

(87) PCT Pub. No.: WO2008/069184
PCT Pub. Date: Jun. 12, 2008

(65) Prior Publication Data
US 2010/0015458 A1    Jan. 21, 2010

(30) Foreign Application Priority Data

Dec. 4, 2006  (JP) ................. 2006-327656
Dec. 4, 2006  (JP) ................. 2006-327657

(51) Int. Cl.
*C08L 61/02* (2006.01)

(52) U.S. Cl. ........ 525/398; 525/405; 528/230; 528/248; 528/254; 528/270

(58) Field of Classification Search ............... 525/398, 525/405; 528/230, 248, 254, 270
See application file for complete search history.

(56) References Cited

U.S. PATENT DOCUMENTS

| 4,493,751 | A | * | 1/1985 | Cherdron et al. | ......... 162/157.2 |
| 4,731,397 | A | * | 3/1988 | Auerbach et al. | ......... 523/439 |
| 7,247,665 | B1 | * | 7/2007 | Woerner et al. | ......... 524/100 |
| 2002/0193480 | A1 | * | 12/2002 | Okawa et al. | ......... 524/283 |
| 2005/0131198 | A1 | | 6/2005 | Okawa | |

FOREIGN PATENT DOCUMENTS

| DE | 2947490 | * | 6/1981 |
| JP | 07 011101 | | 1/1995 |
| JP | 07 179720 | | 7/1995 |
| JP | 07 278407 | | 10/1995 |
| JP | 09 241344 | | 9/1997 |
| JP | 11 209450 | | 8/1999 |
| JP | 2001 073241 | | 3/2001 |
| JP | 2003 089925 | | 3/2003 |
| JP | 2004 181718 | | 7/2004 |
| WO | WO01/18114 | * | 3/2001 |

* cited by examiner

*Primary Examiner* — David W Wu
*Assistant Examiner* — Robert Jones, Jr.
(74) *Attorney, Agent, or Firm* — Oblon, Spivak, McClelland, Maier & Neustadt, L.L.P.

(57) ABSTRACT

Provided is an oxymethylene copolymer composition for a stretched material having a high strength and a high elastic modulus, the composition including: an oxymethylene copolymer; and a crosslinkable compound to be blended with the oxymethylene copolymer in an amount of 0.001 to 0.05 part by mass with respect to 100 parts by mass of the oxymethylene copolymer. The present invention also relates to a stretched material obtained by using the oxymethylene copolymer composition. Further, the present invention relates to a structure obtained by the secondary processing of the above stretched material, and a structure obtained by using the above oxymethylene copolymer composition in a bonding layer of the structure. The present invention also relates to a method of producing a structure, the method including: using the oxymethylene copolymer composition in a bonding layer of the structure; and removing a polyalkylene glycol component with water or a solvent.

10 Claims, No Drawings

OXYMETHYLENE COPOLYMER COMPOSITION FOR STRETCHING MATERIAL, STRETCHING MATERIAL, STRUCTURES, AND PROCESS FOR PRODUCING THE SAME

TECHNICAL FIELD

The present invention relates to an oxymethylene copolymer composition for a stretched material suitable for a stretched body composed of an oxymethylene copolymer and having a high strength and a high elastic modulus. In addition, the present invention relates to a stretched material and a structure (a structural body) each using the composition, and a method of producing the structure.

BACKGROUND ART

Stretched bodies conventionally investigated and commercialized are each composed of: a polyolefin resin such as polyethylene or polypropylene; a polyester resin such as polyethylene terephthalate; or a polyamide resin such as nylon 6 or a nylon 6/66 copolymer. The stretching of an oxymethylene polymer has a long history, and, for example, Clark et al. have investigated a super-stretched fiber (see Non-patent Document 1). The oxymethylene polymer generally has the following characteristics: the polymer has a high degree of crystallinity; and is excellent in rigidity, strength, chemical resistance, and creep resistance. In addition, the oxymethylene polymer has been used mainly as a material for injection molding in a wide variety of applications including mechanism elements for automobiles and electrical apparatuses because the polymer crystallizes at a high rate. Further, the oxymethylene polymer has an extremely high ultimate theoretical strength, and the strength suggests that the polymer is turned into a body having a high strength and a high elastic modulus by orientation crystallization based on stretching.

However, the oxymethylene polymer has the following drawbacks: the polymer has a high degree of crystallinity, its melting point peak observed by DSC is extremely sharp, and the melting point and crystallization softening temperature of the polymer are so close to each other that it is hard to stretch the polymer. In addition, the fact that the polymer crystallizes at a high rate also largely constrains the stretch processing of the polymer.

In addition, in recent years, attention has been paid to, for example, the chemical resistance and abrasion resistance of oxymethylene polymers and copolymers, and, as a result, the development of new applications of a fiber and a structure obtained from the fiber as stretched materials as well as conventional injection- and extrusion-molded articles has been advanced. Accordingly, not only an improvement in technique for turning any such polymer or copolymer into a fiber by spinning or stretch processing but also an improvement in technique for the secondary processing of the polymer or copolymer has been requested.

A method involving the use of a specific oxymethylene polymer for spinning or stretch processing has been known (see Patent Document 1). The document describes a fiber using an oxymethylene copolymer that crystallizes at a low rate, and a method of producing the fiber. However, the document merely describes, in any one of its examples, an antioxidant or a heat stabilizer as an additive to be added to the oxymethylene copolymer, and refers to neither the kind nor amount of the additive nor an influence of the additive.

Non-Patent Document 1: polymer Engineering and Science, October, 1974, Vol. 14, No. 10, p. 682-686
Patent Document 1: JP 2003-089925 A

DISCLOSURE OF THE INVENTION

Problems to be Solved by the Invention

The present invention provides an oxymethylene copolymer composition for a stretched material having good stretch processability, a stretched material and a structure each using the composition, and a method of producing the structure.

Means for Solving the Problems

The inventors of the present invention have made extensive studies with a view to solving the above-mentioned problems. As a result, the inventors have found that an oxymethylene copolymer composition for a stretched material having good stretch processability can be obtained by blending an oxymethylene copolymer with a predetermined amount of a compound that forms a crosslinked structure (hereinafter referred to as "crosslinkable compound"). Further, the inventors have found that the addition of a polyalkylene glycol to the composition results in a material extremely excellent in stretch processability and secondary processability.

That is, the present invention provides an oxymethylene copolymer composition for a stretched material including: an oxymethylene copolymer; and a crosslinkable compound to be blended with the oxymethylene copolymer in an amount of 0.001 to 0.05 part by mass with respect to 100 parts by mass of the oxymethylene copolymer.

In addition, the present invention provides a stretched material obtained by using the oxymethylene copolymer composition.

Further, the present invention provides a structure obtained by secondary processing of the stretched material and a structure obtained by using the oxymethylene copolymer composition in a bonding layer of the structure.

In addition, the present invention provides a method of producing a structure including: using the oxymethylene copolymer composition in a bonding layer of the structure; and removing a polyalkylene glycol component with water or a solvent.

Effects of the Invention

According to the present invention, there can be provided an oxymethylene copolymer composition for a stretched material having good stretch processability, a stretched material and a structure each using the composition, and a method of producing the structure.

BEST MODE FOR CARRYING OUT THE INVENTION

An oxymethylene copolymer composition for a stretched material of the present invention is obtained by blending 100 parts by mass of an oxymethylene copolymer with 0.001 to 0.05 part by mass of a crosslinkable compound. The crosslinkable compound to be added and blended in the present invention preferably functions as a heat stabilizer.

Such crosslinkable compound is typically blended in an amount of 0.1 to 5.0 parts by mass with respect to 100 parts by mass of the oxymethylene copolymer. However, when the composition is used as a stretched material as in the case of the present invention, in consideration of, in particular, the fact that an amine-substituted triazine compound as a crosslinkable compound is bonded to a molecular terminal of formaldehyde or of the oxymethylene copolymer, investigation on an appropriate amount in which the crosslinkable compound is blended is of extreme importance. That is, the amount in which the crosslinkable compound is blended must be set in such a manner that an oxymethylene copolymer composition to be obtained has sufficient heat stability, and causes no stretching unevenness under its processing conditions.

In view of the foregoing, in the present invention, the amount in which the crosslinkable compound is blended is set within such range as described above so that the stretch processability of the composition is good. When the amount in which the crosslinkable compound is blended is less than 0.001 part by mass, the heat stability of the composition reduces at the time of the stretching of the composition, with the result that the processability of the composition reduces. In addition, when the amount exceeds 0.05 part by mass, the composition causes stretching unevenness at the time of its stretch processing, with the result that the processability of the composition reduces. The amount in which the crosslinkable compound is blended is preferably 0.002 to 0.04 part by mass, or more preferably 0.002 to 0.03 part by mass.

Examples of the crosslinkable compound according to the present invention include: amine-substituted triazine compounds such as melamine, a melamine resin, methylol melamine, benzoguanamine, cyanoguanidine, N,N-diarylmelamine, CTU guanamine (3,9-bis[2-(3,5-diamino-2,4,6-triazaphenyl)ethyl]-2,4,8,10-tetraoxaspiro[5,5]undecane), and CMTU guanamine (3,9-bis[1-(3,5-diamino-2,4,6-triazaphenyl)methyl]-2,4,8,10-tetraoxaspiro[5,5]undecane); polyamides; urea derivatives; hydrazine derivatives; and urethanes. Of those, melamine is particularly preferable.

The oxymethylene copolymer in the present invention is preferably a copolymerized product (oxymethylene copolymer) containing a repeating unit represented by the following general formula (1) and obtained by causing trioxane and one or more kinds of comonomers in an amount of 0.5 to 50.0 parts by mass with respect to 100 parts by mass of trioxane to react with each other.

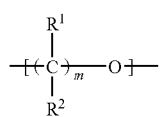

(1)

In the above formula (1), $R^1$ and $R^2$ each independently represent a hydrogen atom, an alkyl group, an organic group having an alkyl group, a phenyl group, or an organic group having a phenyl group, and m represents an integer of 1 to 6. The alkyl group is, for example, an alkyl group having 1 to 8 carbon atoms.

Examples of the above comonomers to be used for the oxymethylene copolymer include a cyclic ether and a cyclic formal that are conventionally known. Specific preferable examples of the comonomers include: 1,3-dioxolane and its derivatives; 1,3-dioxepane and its derivatives; 1,3,5-trioxepane and its derivatives; 1,3,6-trioxocane and its derivatives; and a monofunctional glycidyl ether.

The oxymethylene copolymer preferably has an aliphatic branched structure composed of at least one group selected from the group consisting of an alkyl group, an alkylene group, an alkenyl group, and an alkynyl group. When the oxymethylene copolymer has such branched structure, the composition can be turned into a stretched material excellent in processability.

A method of introducing the branched structure into the oxymethylene copolymer is, for example, a method involving copolymerizing a monofunctional glycidyl ether-based compound and/or a polyfunctional glycidyl ether-based compound each serving as a monomer. Examples of the glycidyl ether-based compounds include glycidyl ether-based compounds each represented by the following formula (2), compounds each having a branch such as 2-ethylhexyl glycidyl ether, and a mixture of two or more compounds selected from them. In particular, n-butyl glycidyl ether is suitably used. Such compound is used in an amount of preferably 0.001 to 10 parts by mass, more preferably 0.001 to 1 part by mass, or still more preferably 0.01 to 0.5 part by mass with respect to 100 parts by mass of trioxane.

When such compound is used in an amount of 0.001 part by mass or more, an effect of the introduction of the branched structure is easily exerted. When such compound is used in an amount of 10 parts by mass or less, the heat stability of an oxymethylene copolymer to be obtained becomes good because the need for adding an excessive amount of a catalyst due to a reduction in activity of a polymerization reaction can be eliminated.

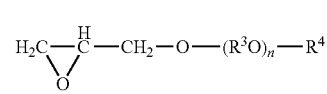

(2)

In the formula (2), $R^3$ represents an alkylene group having 1 to 30 carbon atoms, n represents an integer of 0 to 20, and $R^4$ represents an alkyl group having 1 to 30 carbon atoms, or an alkenyl or alkynyl group having 2 to 20 carbon atoms.

The oxymethylene copolymer composition of the present invention preferably contains a polyalkylene glycol.

Polyalkylene glycols showing various states can each be used; a polyalkylene glycol showing a liquid state or a wax state at normal temperature is preferably used. Examples of such polyalkylene glycol include: homopolymers and copolymers of a polyethylene glycol, a polypropylene glycol, a polybutylene glycol, a polytetramethylene glycol, and a polydioxolane; compounds each obtained by causing any one of them to react with a diisocyanate or by bonding any one of them to the diisocyanate; and compounds each obtained by denaturing a terminal of any one of them with an ester or an ether.

It should be noted that the phrase "showing a liquid state at normal temperature" refers to a state where the polyalkylene glycol has a viscosity of 15 cSt or less at 99° C., and the phrase "showing a wax state at normal temperature" refers to a state where the polyalkylene glycol has a viscosity of 15 to 50 cSt at 99° C. (Solvent Handbook, Kodansha Scientific Ltd., p. 791).

A polyethylene glycol is particularly suitably used, and a polyethylene glycol having a molecular weight of 200 to 2,000 is more suitably used. When the molecular weight is 200 or more, a dispersion loss at the time of the production of the oxymethylene copolymer composition, and the bleeding of a raw material for the composition at the time of the processing of the composition can be suppressed while the good moldability of the composition is maintained. When the molecular weight is 2,000 or less, the secondary processing of the composition can be favorably performed while an improving effect on the stretchability of the composition is exerted.

It should be noted that the secondary processing in this case is as follows: the melting point of the composition lowers by virtue of the addition of the polyalkylene glycol, and, when an ordinary oxymethylene copolymer or the like is used as a base material, there is a moderate difference in melting point between the composition and the copolymer, whereby the composition can be thermally bonded to another composition in a favorable manner. As the difference in melting point increases, a temperature at the time of the thermal bonding can be made lower than the melting point of the base material, so the thermal contraction or deformation of the base material than expected can be prevented.

The polyalkylene glycol is incorporated in an amount of preferably 0.01 to 50 parts by mass, more preferably 0.01 to 20 parts by mass, or still more preferably 0.05 to 10 parts by mass with respect to 100 parts by mass of the oxymethylene copolymer.

When the polyalkylene glycol is incorporated in an amount of 0.01 part by mass or more, an effect of the addition of the polyalkylene glycol is easily exerted. When the polyalkylene glycol is incorporated in an amount of 50 parts by mass or less, the bleeding of a raw material for the composition at the time of the processing of the composition can be suppressed.

The polyalkylene glycol may be added upon stabilization treatment of the oxymethylene copolymer, or may be compounded in the oxymethylene copolymer that has been already obtained. Further, the following procedure may be adopted: the polyalkylene glycol is added simultaneously with the plasticization of the oxymethylene copolymer at the time of the stretch processing of the copolymer, and the polyalkylene glycol and the copolymer are melted and mixed.

A conventionally known antioxidant is preferably added to the oxymethylene copolymer composition of the present invention in the production stage of the composition.

As the antioxidant, a sterically hindered phenol is exemplified. Specific examples of the commercially available phenol-based antioxidant include 1,6-hexanediol-bis[3-(3,5-di-t-butyl-4-hydroxyphenyl)propionate], triethyleneglycol bis-3-(3-t-butyl-4-hydroxy-5-methylphenyl)propionate, pentaerythritol-tetrakis-3-(3,5-di-t-butyl-4-hydroxyphenyl) propionate, 2,2'-methylenebis(6-t-butyl-4-methylphenol), 3,9-bis{2-[3-(3-t-butyl-4-hydroxy-5-methylphenyl]propionyloxy)-1,1-dimethylethyl}-2,4,8,10-tetraoxaspiro[5,5]undecane, N,N'-hexane-1,6-diylbis[3-(3,5-di-t-butyl-4-hydroxyphenyl)propionamide], and 3,5-bis(1,1-dimethylethyl)-4-hydroxybenzene propionate 1,6-hexanediylester. Of those, triethyleneglycol-bis-3-(3-t-butyl-4-hydroxy-5-methylphenyl)propionate, pentaerythrityl-tetrakis-3-(3,5-di-t-butyl-4-hydroxyphenyl)propionate, and 1,6-hexanediol-bis[3-(3,5-di-t-butyl-4-hydroxyphenyl)propionate] are preferably used.

The sterically hindered phenol is added in an amount of preferably 0.01 to 5.0 parts by mass, more preferably 0.01 to 2.0 parts by mass, or still more preferably 0.02 to 1.0 part by mass with respect to 100 parts by mass of the oxymethylene copolymer.

When the sterically hindered phenol is blended in an amount of 0.01 part by mass or more, a reduction in molecular weight of a resin as a raw material for the composition due to the decomposition of the composition at the time of the processing of the composition, and a reduction in processability of the composition due to the inclusion of a gas generated as a result of the decomposition can be prevented. When the sterically hindered phenol is blended in an amount of 5.0 parts by mass or less, the deterioration of the external appearance of a product due to an increase in bleeding can be prevented.

It should be noted that a known additive or filler can be added to the oxymethylene copolymer composition of the present invention, which contains mainly the above oxymethylene copolymer, to such an extent that an original object of the present invention is not impaired. Examples of the additive include a crystal nucleating agent, an antioxidant (excluding the above-mentioned antioxidant), a plasticizer, a delustering agent, a foaming agent, a lubricant, a release agent, an antistatic agent, a UV absorber, a light stabilizer, a heat stabilizer (excluding the crosslinkable compound according to the present invention), a deodorant, a flame retardant, a sliding agent, a perfume, and an antibacterial agent. In addition, examples of the filler include a glass fiber, talc, mica, calcium carbonate, and a potassium titanate whisker. Further, a pigment or a dye can be added to the composition in order that the composition may be finished in a desired color. In addition, the composition can be denatured by adding, for example, any one of various monomers, a coupling agent, a terminal treating agent, any other resin, wood dust, or starch.

Further, the oxymethylene copolymer composition of the present invention may be used as a stretching material. As a form of the copolymer composition, a film, a sheet, a fiber, a multifilament, a monofilament, a loop, a net, a textile, a knit fabric, nonwoven fabric, and filter are exemplified. Further, examples of the stretching material include but not limited, fabricated materials thereof.

It should be noted that a structure to be obtained in the present invention can use the oxymethylene copolymer composition of the present invention as a constituting component or in a bonding layer for bonding members. When the structure is used as a constituting component, the structure may be used as it is, or may be additionally processed. For example, the structure can be turned into a structure in which at least one kind of a material containing the oxymethylene copolymer is constituted of multiple layers by repeating, or simultaneously performing, similar bonding operations.

In addition, an additionally sophisticated structure can be formed by newly bonding a structure obtained by bonding materials to each other once to a material containing another oxymethylene copolymer with a different shape.

Further, a structure can be produced by: using an oxymethylene copolymer composition containing a polyalkylene glycol in a bonding layer of the structure; and removing the polyalkylene glycol component with water or a solvent.

Hereinafter, the present invention will be described more specifically by way of examples. However, the present invention is not limited to the examples.

EXAMPLES 1 TO 7 AND COMPARATIVE EXAMPLES 1 TO 4

1,3-dioxolane in blended amounts shown in Table 1 below with respect to 100 parts by mass of trioxane (also referred to as "TOX"), a catalyst (solution of boron trifluoride diethyl etherate in benzene: 0.62 mol/kg-benzene), and a molecular weight modifier (solution of methylal in benzene: 25 mass %) were continuously added, and the mixture was continuously polymerized in a biaxial kneader with a self-cleaning type paddle having a jacket with its temperature set to 65° C. in such a manner that the time period for which the mixture resided in a polymerizing machine might be 15 minutes.

It should be noted that, in each of Examples 1 to 5 and Comparative Examples 1 to 3, the amount of the catalyst was 0.04 mmol/mol-TOX, and the content of the molecular weight modifier was 0.17 wt % (with respect to TOX).

In Example 6, the amount of the catalyst was 0.03 mmol/mol-TOX, and the content of the molecular weight modifier was 0.2 wt % (with respect to TOX).

In each of Example 7 and Comparative Example 4, the amount of the catalyst was 0.06 mmol/mol-TOX, and the content of the molecular weight modifier was 0.1 wt %.

A solution of triphenylphosphine in benzene (25 mass %) was added to the produced polymerized product in such a manner that the amount of the solution might be 2 mol with respect to 1 mol of added boron trifluoride diethyl etherate. After the catalyst had been deactivated, the resultant was pulverized, whereby a granular oxymethylene copolymer was obtained.

Next, 0.3 part by mass of triethylene glycol-bis[3-(3-t-butyl-5-methyl-4-hydroxyphenyl)propionate], and melamine as a heat stabilizer and a polyethylene glycol (PEG 20000) in amounts as shown in Table 1 below were added to 100 parts by mass of the granular oxymethylene copolymer, and the whole was uniformly mixed. After that, the mixture was supplied to a biaxial extruder with a vent, and was melted and kneaded under a reduced pressure of 160 Torr at 200° C. so as to be pelletized, whereby an oxymethylene copolymer composition according to each of Examples 1 to 7 and Comparative Examples 1 to 4 was obtained.

(Stretching Test)

The above oxymethylene copolymer composition was melted in a uniaxial extruder having a cylinder with its temperature set to 220° C. A fiber was continuously spun from a die for spinning having an aperture of 0.6 mm and 24 holes, and was wound on a take-up roller at about 200 m/min. The resultant was continuously introduced into a stretching roller heated to 130° C. so as to be subjected to a stretching treatment.

As shown in Table 1 below, the number of revolutions of the stretching roller was changed, a ratio of the number of revolutions of the stretching roller to the number of revolutions of the take-up roller was defined as a stretch ratio, and the stretch ratio at which the fiber was cut and it became hard to operate the roller was defined as a maximum stretch ratio. Table 1 below shows the results.

In addition, the surface of a structure after the stretching was observed with an SEM (VE-9800 manufactured by KEYENCE CORPORATION) at a magnification of 200 so that whether "stretch unevenness" was present or absent was confirmed. It should be noted that a state where a nodular unstretched site remained was evaluated as "stretch unevenness is present", and a state where no nodular unstretched site remained was evaluated as "good". Table 1 below shows the results.

TABLE 1

|  | Blended amount (part(s) by mass) | | | | Stretching test | | |
|---|---|---|---|---|---|---|---|
|  | Trioxane | 1,3-dioxolane | Melamine | Polyethylene glycol | Stretching roller (m/min) | Maximum stretch ratio (times) | Results of observation with SEM |
| Example 1 | 100 | 4 | 0.005 | — | 1200 | 6.0 | Good |
| Example 2 | 100 | 4 | 0.005 | 0.15 | 1240 | 6.2 | Good |
| Example 3 | 100 | 4 | 0.025 | 0.15 | 1200 | 6.0 | Good |
| Example 4 | 100 | 4 | 0.05 | 0.15 | 1180 | 5.9 | Good |
| Example 5 | 100 | 4 | 0.05 | 3.00 | 1260 | 6.3 | Good |
| Example 6 | 100 | 1.5 | 0.05 | 3.00 | 1220 | 6.1 | Good |
| Example 7 | 100 | 13 | 0.05 | 3.00 | 1680 | 8.4 | Good |
| Comparative Example 1 | 100 | 4 | 0.1 | — | 860 | 4.3 | Stretch unevenness is present |
| Comparative Example 2 | 100 | 4 | 0.1 | 0.15 | 880 | 4.4 | Stretch unevenness is present |
| Comparative Example 3 | 100 | 4 | 0.3 | 3.00 | 920 | 4.6 | Stretch unevenness is present |
| Comparative Example 4 | 100 | 13 | 0.3 | 0.15 | 1140 | 5.7 | Stretch unevenness is present |

EXAMPLES 8 TO 13 AND COMPARATIVE EXAMPLES 5 TO 7

An oxymethylene copolymer composition according to each of Examples 8 to 13 and Comparative Examples 5 to 7 was produced in the same manner as in Example 1 except that the materials were blended with each other in amounts shown in Table 2 below. In addition, a stretching test was performed in the same manner as in Example 1. Table 2 shows the results of the evaluation.

EXAMPLES 14 TO 17

An A40 manufactured by Mitsubishi Engineering-Plastics Corporation and showing a melting point of 172° C. (melt index (MI)=50 g/10 min) was used as an oxymethylene copolymer (A), and each of the oxymethylene copolymer compositions of Examples 8 to 11 described in Table 2 below was used as an oxymethylene copolymer (B). A two-component, multilayer fiber (the section of each of the copolymers was semicircular) was subjected to melt spinning by the same method as that of the above-mentioned stretching test, whereby a filament was produced.

The resultant filament was cut into pieces each having a length of 10 cm. The pieces were placed on an iron plate so as to cross each other, and were sandwiched between the above iron plate and another iron plate. The resultant was subjected to a thermal bonding treatment under pressure by being heated with a hydraulic hot pressing device, which had been heated in advance to a temperature shown in Table 3 below, for 30 minutes. After the treatment, the bonding state of the site where the filaments crossed each other was visually observed. Further, the length of each filament after the treatment was measured, and the percentage by which the filament thermally contracted after the treatment as compared to its length before the treatment was measured. In addition, the molten state of the entirety of the filament after the hot pressing was also visually observed. Table 3 below shows the results of the evaluation.

COMPARATIVE EXAMPLES 8 TO 11

In each of Comparative Examples 8 and 9, the oxymethylene copolymer composition described in Comparative Example 5 was used as the oxymethylene copolymer (B). In each of Comparative Examples 10 and 11, the oxymethylene copolymer composition described in Comparative Example 6 was used as the oxymethylene copolymer (B). Evaluation was performed in the same manner as in each of Examples 14 to 17 except the foregoing points. Table 3 below shows the results.

The invention claimed is:
1. An oxymethylene copolymer composition for a stretched material, comprising:
an oxymethylene copolymer; and
a crosslinkable compound comprising melamine to be blended with the oxymethylene copolymer in an amount of 0.005 to 0.05 parts by mass with respect to 100 parts by mass of the oxymethylene copolymer
wherein the oxymethylene copolymer comprises a repeating unit represented by the general formula (1) and is a copolymerized product of trioxane and 1,3-dioxolane in an amount of 4 to 13 parts by mass with respect to 100 parts by mass of trioxane:

(1)

where $R^1$ and $R^2$ each independently represent a hydrogen atom, and m represents an integer of 1 to 2.

TABLE 2

|  | Amount in which trioxane is blended (part(s) by mass) | Amount in which 1,3-dioxolane is blended (part(s) by mass) | Amount in which melamine is blended (part(s) by mass) | Polyethylene glycol | | | Melting point of oxymethylene copolymer composition (° C.) | Stretching test | | |
|---|---|---|---|---|---|---|---|---|---|---|
|  |  |  |  | Molecular weight | State at normal temperature | Blended amount (part(s) by mass) |  | Stretching roller (m/min) | Maximum stretch ratio (times) | Results of observation with SEM |
| Example 8 | 100 | 13 | 0.005 | 200 | Liquid | 10 | 151 | 1200 | 6.0 | Good |
| Example 9 | 100 | 13 | 0.005 | 300 | Liquid | 10 | 151 | 1240 | 6.2 | Good |
| Example 10 | 100 | 13 | 0.025 | 600 | Liquid | 10 | 151 | 1200 | 6.0 | Good |
| Example 11 | 100 | 13 | 0.05 | 1500 | Wax | 10 | 152 | 1180 | 5.9 | Good |
| Example 12 | 100 | 13 | 0.05 | 6000 | Powder | 10 | 154 | 1200 | 6.0 | Good |
| Example 13 | 100 | 13 | 0.05 | 20000 | Powder | 10 | 154 | 1220 | 6.1 | Good |
| Comparative Example 5 | 100 | 13 | 0.3 | — | — | 0 | 155 | 1080 | 5.4 | Stretch unevenness is present |
| Comparative Example 6 | 100 | 13 | 0.3 | 100 | Liquid | 10 | 154 | 1080 | 5.4 | Stretch unevenness is present |
| Comparative Example 7 | 100 | 13 | 0.3 | 300 | Liquid | 10 | 151 | 1120 | 5.5 | Stretch unevenness is present |

TABLE 3

|  | Layer structure | Difference in melting point between (A) and (B) (° C.) | Hot pressing temperature (° C.) | Hot pressing time (min) | Bonding state | State of entirety of filament after hot pressing | Percentage of contraction (%) |
|---|---|---|---|---|---|---|---|
| Example 14 | Semicircular | 21 | 155 | 30 | Bonded | Not melted | 2.7 |
| Example 15 | Semicircular | 21 | 155 | 30 | Bonded | Not melted | 2.7 |
| Example 16 | Semicircular | 21 | 155 | 30 | Bonded | Not melted | 2.8 |
| Example 17 | Semicircular | 20 | 155 | 30 | Bonded | Not melted | 3.3 |
| Comparative Example 8 | Semicircular | 17 | 155 | 30 | Insufficiently bonded | Not melted | — |
| Comparative Example 9 | Semicircular | 17 | 160 | 30 | Bonded | Not melted | 8.7 |
| Comparative Example 10 | Semicircular | 18 | 155 | 30 | Insufficiently bonded | Not melted | — |
| Comparative Example 11 | Semicircular | 18 | 160 | 30 | Bonded | Not melted | 8.7 |

2. The oxymethylene copolymer composition for a stretched material according to claim 1, further comprising a polyalkylene glycol.

3. The oxymethylene copolymer composition for a stretched material according to claim 2, wherein the polyalkylene glycol is incorporated in an amount of 0.01 to 50 parts by mass with respect to 100 parts by mass of the oxymethylene copolymer.

4. The oxymethylene copolymer composition for a stretched material according to claim 2, wherein the polyalkylene glycol is in a liquid state or a wax state at normal temperature.

5. The oxymethylene copolymer composition for a stretched material according to claim 4, wherein the polyalkylene glycol comprises a polyethylene glycol.

6. The oxymethylene copolymer composition for a stretched material according to claim 1, wherein the oxymethylene copolymer has an aliphatic branched structure composed of at least one group selected from the group consisting of an alkyl group, an alkylene group, an alkenyl group, and an alkynyl group.

7. A stretched material obtained by incorporating the oxymethylene copolymer composition according to claim 1.

8. A structure obtained by secondary processing of the stretched material according to claim 7.

9. A structure obtained by incorporating the oxymethylene copolymer composition according to claim 1 in a bonding layer of the structure.

10. A method of producing a structure, comprising:
   incorporating the oxymethylene copolymer composition according to claim 2 in a bonding layer of the structure; and
   removing a polyalkylene glycol component with water or a solvent.

* * * * *